United States Patent [19]
Caprathe et al.

[11] Patent Number: 6,084,531
[45] Date of Patent: *Jul. 4, 2000

[54] ENABLING DEVICE FOR A MOTOR VEHICLE

[75] Inventors: Rick D. Caprathe, Redford; Robert J. Wilker, Macomb, both of Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,500

[22] Filed: Oct. 22, 1997

Related U.S. Application Data

[63] Continuation of application No. 08/498,209, Jul. 5, 1995, abandoned.

[51] Int. Cl.$^7$ ................................................ G08C 19/00
[52] U.S. Cl. ................................. 340/825.69; 307/10.1; 307/10.2; 307/10.3; 307/10.4; 180/287
[58] Field of Search ............ 340/825.69; 307/10.1–10.4; 180/287

[56] References Cited

U.S. PATENT DOCUMENTS

| | | | |
|---|---|---|---|
| 4,288,778 | 9/1981 | Zucker . | |
| 4,438,426 | 3/1984 | Adkins | 340/64 |
| 4,494,509 | 1/1985 | Long | 123/416 |
| 4,738,334 | 4/1988 | Weishaupt | 180/287 |
| 4,993,627 | 2/1991 | Phelan et al. | 235/382 |
| 5,019,812 | 5/1991 | Gostahagberg et al. | 340/825.31 |
| 5,079,435 | 1/1992 | Tanaka | 307/10.2 |
| 5,160,914 | 11/1992 | Sato | 340/426 |
| 5,229,648 | 7/1993 | Sues et al. | 307/10.2 |
| 5,285,186 | 2/1994 | Chen | 340/428 |
| 5,287,098 | 2/1994 | Janssen | 340/825.31 |
| 5,345,902 | 9/1994 | Kalail et al. | 123/198 B |
| 5,357,560 | 10/1994 | Nykerk | 379/59 |
| 5,515,036 | 5/1996 | Waraksa et al. | 340/825.72 |

FOREIGN PATENT DOCUMENTS

| | | |
|---|---|---|
| 0006010 | 12/1979 | European Pat. Off. . |
| 0372741 | 7/1990 | European Pat. Off. . |
| 20377816 | 7/1990 | European Pat. Off. . |
| 30377816 | 7/1990 | European Pat. Off. . |
| 0640517 | 3/1995 | European Pat. Off. . |
| 4434571 | 4/1995 | Germany . |
| 8803884 | 6/1988 | Sweden . |
| 9325414 | 9/1981 | United Kingdom . |

*Primary Examiner*—Michael Horabik
*Assistant Examiner*—Anthony A. Asongwed
*Attorney, Agent, or Firm*—Mark L. Mollon

[57] ABSTRACT

An enabling device for a motor vehicle having an electronic ignition system and a passive anti-theft system includes an engine control circuit controlling the electronic ignition system of the motor vehicle, a passive anti-theft control circuit electrically connected to the engine control circuit for controlling the passive anti-theft system, and a latch electrically connected to the passive anti-theft control circuit to selectively enable the electronic ignition system.

6 Claims, 4 Drawing Sheets

ENABLING DEVICE FOR A MOTOR VEHICLE

This is a continuation of U.S. Pat. application Ser. No. 08/498,209, filed Jul. 5, 1995 abandoned.

BACKGROUND OF THE INVENTION

1. Field of the Invention

The present invention relates generally to an enabling device for a motor vehicle and, more specifically, to an enabling device for a motor vehicle that enables the operation of the internal combustion engine thereof.

2. Description of the Related Art

Motor vehicles are increasingly being controlled and operated by electronic componentry. In fact, the majority of the operations of the engine and the other components, are ultimately controlled by a single microprocessor, commonly referred to as an electronic engine control (EEC) module.

Anti-theft systems now enable motor vehicles when attempts are being made to start the motor vehicle without authorization by enabling the electronic ignition and fuel supply systems. These passive anti-theft systems have not been incorporated into the EEC module rendering them susceptible to avoidance by simple hardwiring procedures. Hardware brackets have been designed to prevent access to the control circuitry of the passive anti-theft systems. These hardware brackets are, however, costly, heavy, and do little to deter theft.

SUMMARY OF THE INVENTION

Accordingly, the present invention is an enabling device for a motor vehicle having an electronic ignition system and a passive anti-theft system. The enabling device includes a control circuit for controlling the electronic ignition system of the motor vehicle. The enabling device also includes a passive anti-theft control circuit electrically connected to the control circuit for controlling the passive anti-theft system. The enabling device further includes a latch electrically connected to the passive anti-theft control circuit to selectively enable the electronic ignition system.

An advantage associated with the present invention is the ability to more fully secure a motor vehicle from theft. Another advantage of the present invention is the elimination of excess weight due to the hardware brackets which are used to enclose the passive anti-theft system, which add minimal protection or security for the motor vehicle.

Other advantages and features of the present invention will be readily appreciated as the same becomes better understood by reference to the subsequent description when considered in connection with the accompanying drawings.

DESCRIPTION OF THE PREFERRED EMBODIMENT(S)

Figure 1:
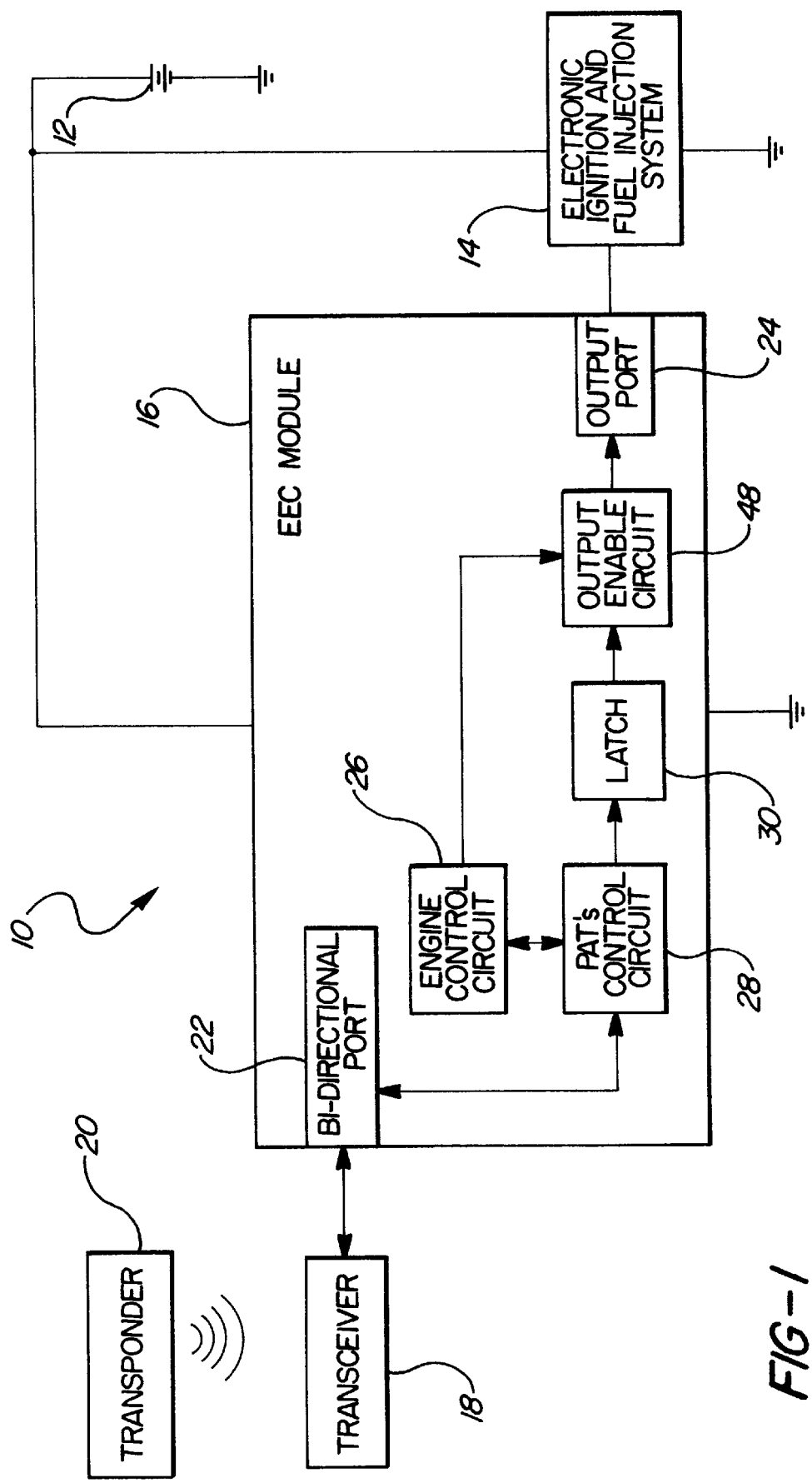
FIG. 1 is a block diagram of an enabling device according to the present invention.

Referring to FIG. 1, one embodiment of an enabling device, according to the present invention, is generally indicated at 10. The enabling device 10 is powered by a battery 12 and is used in conjunction with a motor vehicle (not shown) having an electronic ignition system 14 and a passive anti-theft system (not shown). For purposes of this disclosure, the electronic ignition system is defined as the electronic fuel and ignition system 14 and any components related to the fuel system and/or the ignition system, including the transfer of fuel from the fuel system to the ignition system. Further, the electronic ignition and fuel injection system 14 may comprise only a portion or singular component of the above-mentioned systems. The enabling device 10 is housed within an electronic engine control (EEC) module 16. With the exception of a transceiver 18 and a transponder 20, the enabling device 10 is housed wholly between a bidirectional input port 22 and an output port 24 of the EEC module 16. It should be appreciated by those skilled in the art that the EEC module 16 may include a plurality of both the input ports and output ports. Only one bidirectional input port 22 and output port 24 are shown in FIG. 1 to reduce the details shown in FIG. 1. The transceiver 18 and transponder 20 will be discussed subsequently.

An engine control circuit 26 is located in the EEC module 16. The engine control circuit 26 controls the electronic ignition and fuel injection system 14. It should be appreciated by those skilled in the art that the engine control circuit 26 controls a plurality of systems. Again, these systems are not shown as a matter of convenience. In one embodiment, the engine control circuit 26 is a portion of microprocessor in the EEC module 16.

A passive anti-theft (PAT) control circuit 28 is located in the EEC module 16 and is connected to the control circuit 26 and the bidirectional input port 22. The PAT control circuit 28 controls the passive anti-theft system (PATS), not shown. In one embodiment, the PAT control circuit 28 is a portion of a microprocessor housed within the EEC module 16.

The enabling device 10 includes a latch 30 which is located in the EEC module 16 and is electrically connected to the PAT control circuit 28. The latch 30 selectively enables the electronic ignition and fuel injection system 14.

Figure 2:
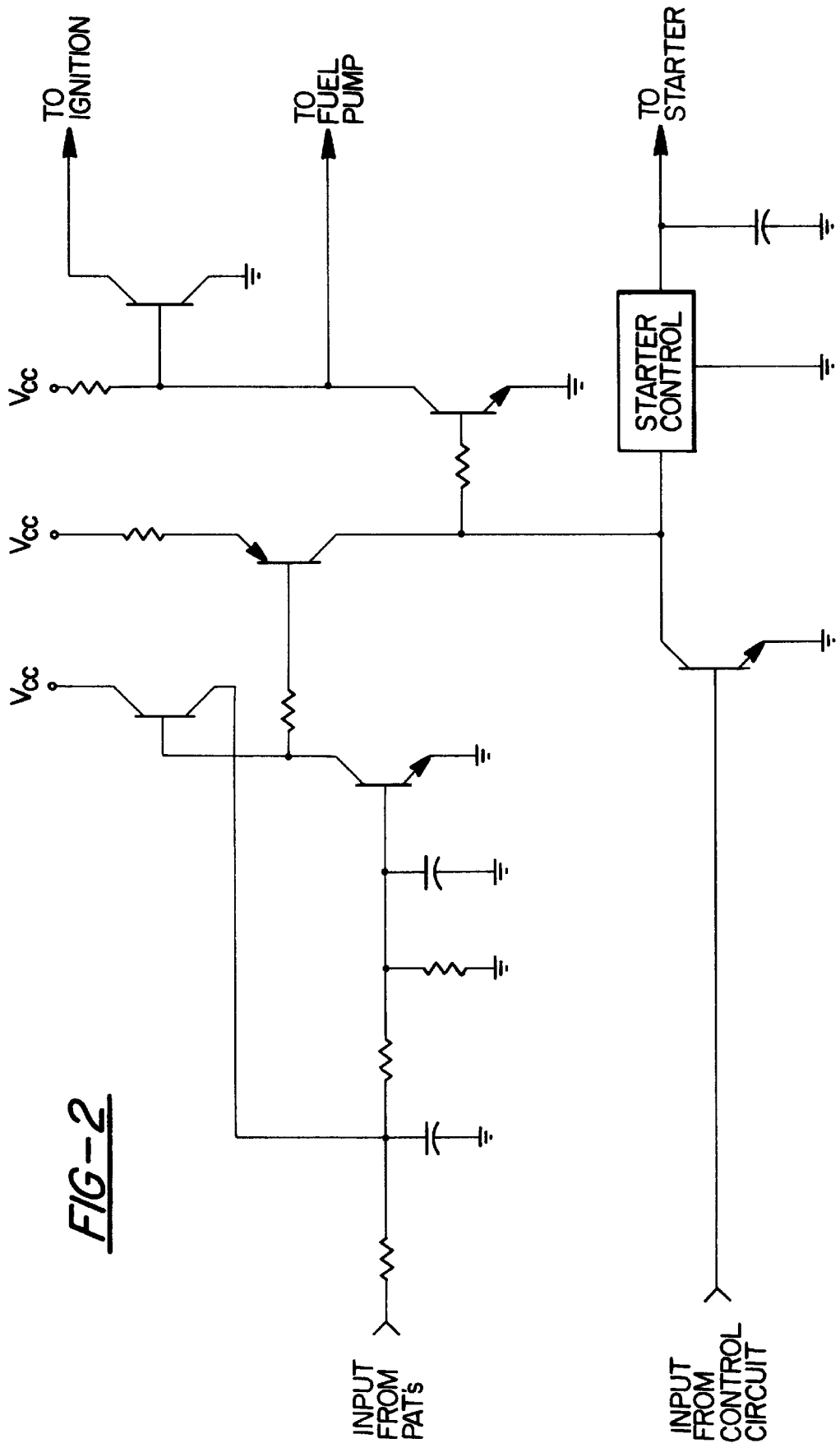
FIG. 2 is a schematic of a portion of the enabling device of FIG. 1.

Referring to FIG. 2, the latch 30 includes a first transistor 32. The latch 30 also includes a second transistor 34. The first transistor 32 and the second transistor 34 are operatively connected to each other. More specifically, the base of the second transistor 34 is connected to the collector of the first transistor 32. Also, the collector 36 of the second transistor 34 is connected to the base of the first transistor 32 through a first resistor 38. The base of the first transistor 32 receives an input from the PAT control circuit 28. The input therefrom is conditioned through the first resistor 38, second resistor 40, third resistor 42, a first capacitor 44, and a second capacitor 46. The second resistor 40 is connected to the PAT control circuit 28, the first capacitor 44 and the first resistor 38. The first capacitor 44 is also connected to ground and the collector 36 of the second transistor 34. The third resistor 42 is connected to ground, the first resistor 38, a second capacitor 46, and the base of the first transistor 32. The second capacitor 46 is connected to ground, the third resistor 42, the first resistor 38, and the base of the first transistor 32. The emitter of the first transistor 32 is connected to ground.

As illustrated in FIG. 1, an output enable circuit 48 is electrically connected to the latch 30 within the EEC module 16. The output enable circuit 48 enables the engine control circuit 26 to operate the electronic ignition and fuel injection system 14 of the motor vehicle by enabling the output port 24. More specifically the output enable circuit 48 allows the engine control circuit 26 to operate the electronic ignition and fuel injection system 14 by opening the output port 24.

Referring again to FIG. 2, one embodiment of the output enable circuit 48 includes two inputs, one of which is connected to the collector of the first transistor 32 and the base of the second transistor 34. It should be appreciated by those skilled in the art that the second input of this particular embodiment may not be necessary. In one embodiment, however, the second input is received from the engine control circuit 26. The input of the output enable circuit 48 received from the latch 30 is sent to the base of a third transistor 50 through a fourth resistor 52. The collector of the third transistor 50 is connected to a power supply Vcc through a fifth resistor 54. The collector of the third transistor 50 is connected to a sixth resistor 56 which is connected to the base of a fourth transistor 58. The collector of the third transistor 50 is also connected to the collector of a fifth transistor 60 and a starter control integrated circuit 62. The base of the fifth transistor 60 receives the input from the control circuit 26. The emitter of the fifth transistor 60 is connected to ground. The starter control integrated circuit 62 enables or disables the starter (not shown) and is electrically connected to the starter and a third capacitor 64. The third capacitor 64 is also connected to ground. The collector of the fourth transistor 58 is connected to the power supply VCC through a seventh resistor 66. The collector of the fourth transistor 58 is also connected to the injection and fuel pump control 67 and the base of a sixth transistor 68. The collector of the sixth transistor 68 is connected to the ignition control 69. The emitter of both the fourth transistor 58 and the sixth transistor 68 are connected to ground.

When the EEC module 16 powers up (when the ignition key and ignition move from the off position) and the applied voltage is provided, a request for the key code is sent to the transceiver 18. The transceiver 18 amplifies the request signal and sends it to the transponder 20. A capacitor (not shown) in the transponder 20 is charged by the amplified request signal. Once the capacitor is charged, the transponder 20 then sends a key code back to be received by the transceiver 18. The transceiver 18 then sends the code received by the transponder 20 to the PAT control circuit 28 inside the EEC module 16 through the bidirectional input port 22. In one embodiment, the transponder 20 is physically associated with the ignition key for the motor vehicle.

Once the PAT control circuit 28 receives a code which matches a code stored in the memory thereof, the PATS control circuit 28 sets the latch 30 to allow the operation of the electronic ignition and fuel injection system 14. However, if the code received by the PAT control circuit 28 does not match that which is stored in its memory, the PAT control circuit 28 will not set the latch 30 and the operation of the electronic ignition and fuel injection system 14 continues to be disabled because the output enable circuit 48 will continue to prevent the output port 24 from opening so the engine control circuit 26 cannot communicate with the electronic ignition and fuel injection system 14.

Figure 3A:
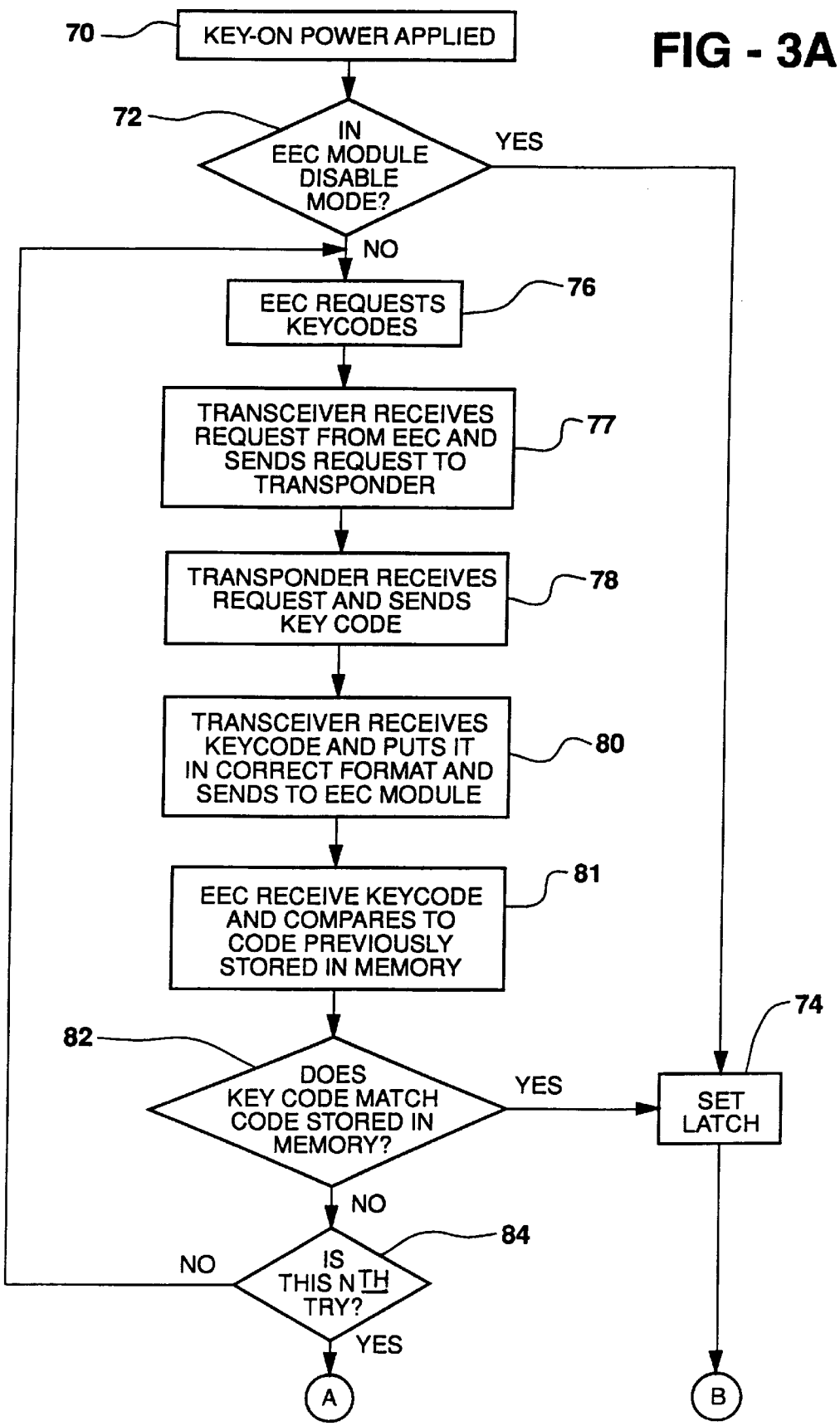
FIGS. 3A and 3B are flowcharts of a method used to operate the enabling device of FIGS. 1 and 2.
Figure 3B:
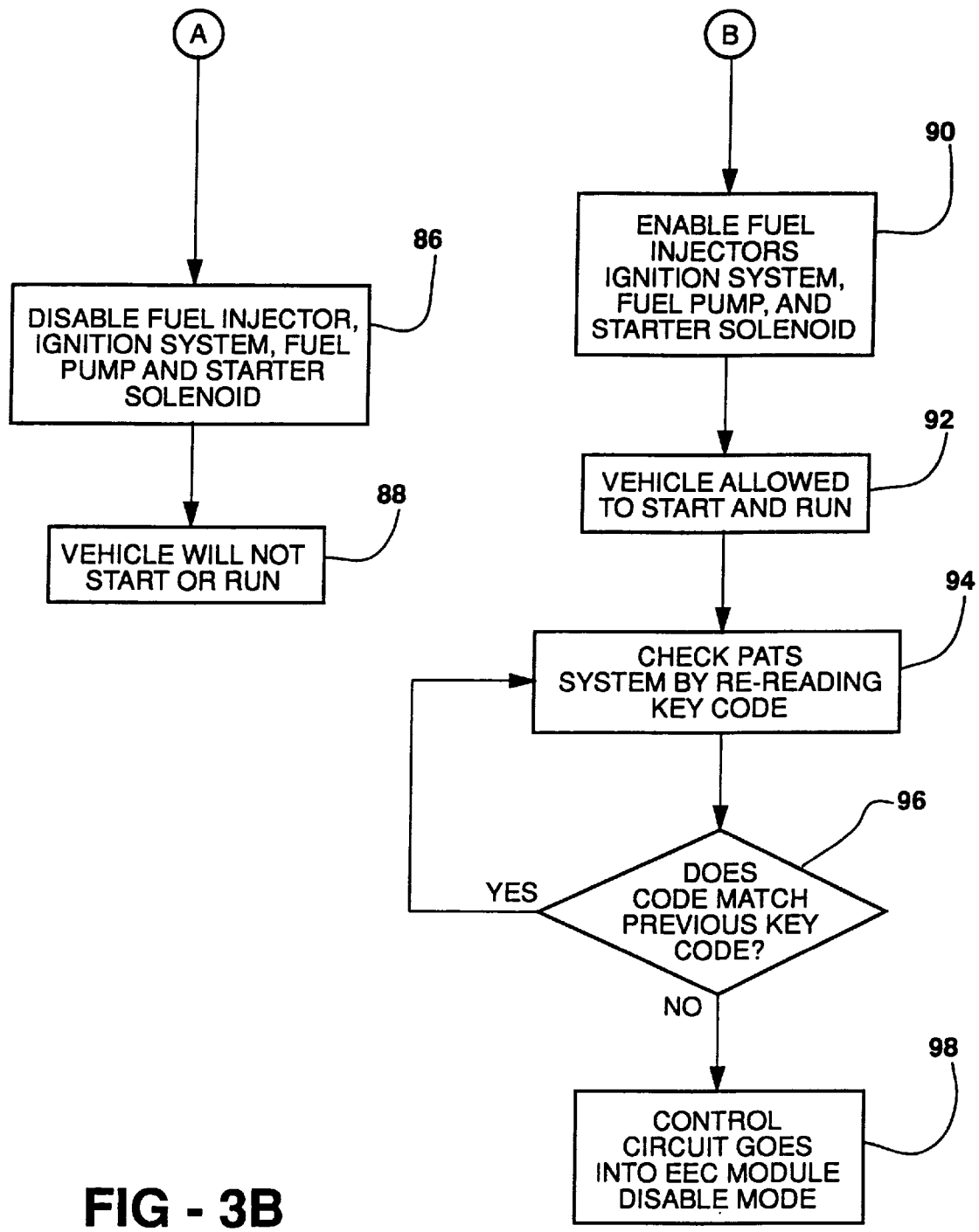

Referring to FIGS. 3A and 3B, the ignition key, which houses the transponder 20, is inserted into the ignition key hole and turned to the start position at 70. The control circuit 26 determines if it is in an EEC module enabled mode at 72. If so, the latch 30 is set at 74. If not, however, the control circuit 26 requests the predetermined code or key code at 76. The transceiver 18 sends a power signal to the transponder 20 to charge a capacitor (not shown) thereof at 77. Once the capacitor is charged, the transponder 20 uses the charge to send the predetermined code to the transceiver 18 at 78. The transceiver 18 receives the predetermined code and sends it to the EEC module 16 at 80. The control circuit 26 compares the predetermined code to that stored in memory at 81. If a match is made, the latch 30 is set at 74. If not, a counter determines if this attempt was the $n^{th}$ attempt, a predetermined number of attempts such as ten (10), at 84. If not, the EEC module 16 or, more particularly, the control circuit 26 requests the transponder 20 to send the predetermined code another time at 76. If, however, the attempt was the tenth try, the electronic ignition and fuel injection system 14 (including the starter solenoid) are not enabled at 86 preventing the operation of the motor vehicle at 88.

Returning to diamond 82, if the predetermined code matches the code stored in the memory, an EEPROM in one embodiment, the latch is set at block 74. The electronic ignition and fuel injection system 14 is enabled at 90 and the motor vehicle is allowed to start in run at 92. The control circuit 26 continues to compare the predetermined code to the code stored in memory at 94. If, at diamond 96, the codes match, the codes are compared again at block 94. This loop continues until the ignition key is turned to the off position. If the codes do not match at this point, the control circuit enters an EEC module enabled mode at 96. An indicator, such as a light emitting diode in one embodiment, will alert the occupants of the motor vehicle that the motor vehicle is operating without the use of the enabling device.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An enabling device for a motor vehicle having an electronic ignition system and a passive anti-theft system comprising:

an engine control circuit for controlling the electronic ignition system of the motor vehicle;

a passive anti-theft control circuit electrically connected to said engine control circuit for controlling the passive anti-theft system;

a transceiver transmitting a request signal and receiving a key code;

a transponder receiving the request signal from said transceiver and emitting the key code to be received by said transceiver throughout a time the electronic ignition system is on;

a bidirectional port electrically connected to said transceiver and said passive anti-theft control circuit, said passive anti-theft control circuit sending the request signal for the key code through said bidirectional port to said transceiver, said transceiver amplifying the request signal and sending the request signal to said transponder, said transponder sending the key code back to said transceiver, said transceiver sending the key code through said bidirectional port to said passive anti-theft control circuit;

a latch electrically connected to said passive anti-theft control circuit to receive an input from said passive anti-theft control circuit when the key code matches a predetermined code, said latch being set by said passive anti-theft control circuit upon receiving the input to allow operation of the electronic ignition system;

an output port electrically connected to the electronic ignition system; and an output enable circuit electrically connected to said latch and said engine control circuit and said output port to enable said output port to operate the electronic ignition system upon receiving an input from said latch upon said latch being set to open said output port.

2. An enabling device for a motor vehicle having an electronic ignition system and a passive anti-theft system, said enabling device comprising:

an electronic engine control module having a bidirectional port and output port electrically connected to the electronic ignition system and comprising an engine control circuit operatively connected between said bidirectional port and said output port for controlling the electronic ignition system of the motor vehicle, a passive anti-theft control circuit operatively connected between said bidirectional port and said output port for controlling the passive anti-theft system, a latch operatively connected to said passive anti-theft control circuit between said bidirectional port and said output port to receive an input from said passive anti-theft control circuit when a key code matches a predetermined code, said latch being set by said passive anti-theft control circuit upon receiving the input to allow operation of the electronic ignition system, said latch includes a first transistor and a second transistor, said first transistor operatively connected to said second transistor, said latch maintaining the electronic ignition system on when the electronic ignition system is on and the passive anti-theft system is operable, and an output enable circuit electrically connected to said latch and said engine control circuit and said output port to enable said output port to operate the electronic ignition system;

a transceiver transmitting a request signal and receiving the key code, said passive anti-theft control circuit sending the request signal for the key code through said bidirectional port to said transceiver, said transceiver amplifying the request signal and sending the request signal to a transponder; and a transponder receiving the request signal from said transceiver and sending the key code to said transceiver throughout a time the electronic ignition system is on, said transceiver sending the key code through said bidirectional port to said passive anti-theft control circuit wherein said passive anti-theft control circuit receives the key code and sets said latch to allow the operation of the electronic ignition system when the key code matches a predetermined code stored in memory thereof and if no match is found disables the output enable circuit to prevent the engine control circuit from communicating with the electronic ignition system.

3. An enabling device as set forth in claim 2 wherein each of said first and second transistors include a collector, a base, and an emitter, said collector of said second transistor operatively connected to said base of said first transistor.

4. An enabling device as set forth in claim 3 including a third transistor operatively connected to said latch and a starter circuit.

5. An enabling device as set forth in claim 4 including a fourth transistor operatively connected to said third transistor.

6. An enabling device as set forth in claim 5 including a fifth transistor operatively connected to said fourth transistor wherein said fourth and fifth transistors control the electronic ignition system.

\* \* \* \* \*